March 29, 1966  S. L. HOWARD  3,242,900
ILLUMINATING DEVICE FOR TRANSMISSION SHIFT INDICATORS
Filed Nov. 25, 1964
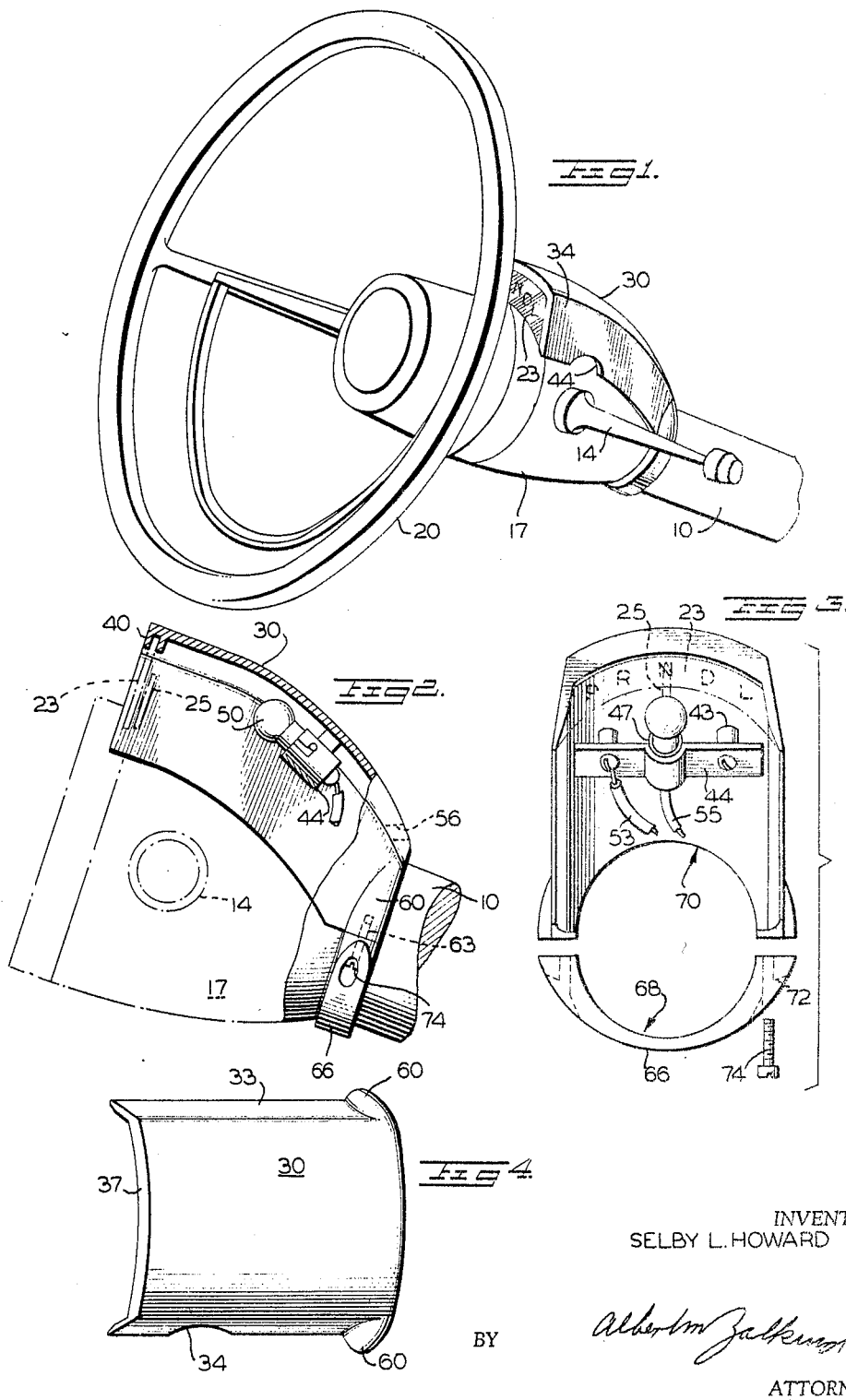
INVENTOR
SELBY L. HOWARD
BY
ATTORNEY

United States Patent Office 3,242,900
Patented Mar. 29, 1966

3,242,900
ILLUMINATING DEVICE FOR TRANSMISSION SHIFT INDICATORS
Selby L. Howard, Marbury, Md.
Filed Nov. 25, 1964, Ser. No. 413,781
5 Claims. (Cl. 116—124)

This invention relates to indicator devices for the gear shift levers of automobiles, and more particularly, to illuminating means therefor.

Certain makes of automobiles having automatic transmissions are provided with gear shift levers which operate indicator needles wherein the needle is disposed behind a transparent plate on which the various shift positions are designated. Movement of the shift lever causes swinging of the needle to indicate a particular letter, such as L, D, etc., so that the driver is apprised as to the gear selected. During daylight hours it is relatively easy to see the needle behind any letter of the scale on the transparent plate. However, when driving at night, unless illumination is provided, it is impossible to see the needle and accordingly, the driver is not certain that the transmission is set for any selected gear. This condition obtains in many automobiles where no illumination is provided for the indicator and constitutes a danger, particularly since it is possible for the driver to shift into reverse gear or forward drive gear when, in fact, he intends to put the transmission in neutral. Accidents of a serious nature can readily occur due to such inadvertencies.

The present invention has for an object to provide an illuminating device for gear shift indicators of a type generally described above.

Another object of the invention is to provide an extremely simple construction for such illuminating means which can be retailed at low cost and readily assembled on a steering post in conjunction with the transparent plate.

A further object of the invention is to provide an assembly which can be readily removed from a steering post for interchange of lamp bulbs.

With the foregoing objects in mind, the invention comprises a hood having sloped top and sides and being of generally channel shape, with means for clamping the hood on the steering column adjacent the shift lever. The front of the hood is fashioned with a groove to accommodate the top edge of the transparent plate of conventional shift indicators, the sides of the hood being approximately contiguous with the exterior of the rotary bowl of the shift lever so as to minimize escape of the stray light from a lamp bulb carried within the hood.

A detailed description of the invention now follows in conjunction with the appended drawing in which:

FIGURE 1 is a perspective showing a steering wheel, shift lever, and steering column, with the invention mounted in place over the rotary bowl of the shift lever;

FIGURE 2 is a longitudinal fragmentary cross-section of the hood mounted over the rotary bowl;

FIGURE 3 is a front view of the hood per se and the mounting clamp therefor, shown as an exploded view; and FIGURE 4 is a plan view of the hood, tilted upward slightly to show details.

Referring now to the drawing, a steering column 10 is shown which carries a rotary gear shift lever 14 and rotary bowl 17, all of conventional construction, together with a steering wheel 20 at the upper end of the column. A conventional, transparent shift indicator or scale plate 23 of arcuate shape is carried on the column with the usual letters P-R-N-D-L inscribed thereon.

A rotative needle 25 swings behind the transparent member so as to be set behind any letter to indicate a selected transmission condition as the shift lever and bowl rotate.

The invention comprises an arcuate hood 30, preferably of molded, opaque plastic, being generally channel shape as best seen in FIGURE 4, with depending, sloping arcuate sides 33 and 34 and a front edge end 37 which is ribbed to provide a groove 40 which accommodates the top edge of the transparent indicator plate 23 as illustrated in FIGURE 2, plate 23 being shown in phantom in FIGURE 3. As best seen in FIGURE 1, the side 34 is provided with a notch 42 to accommodate the base of the shift lever 14 when it is in maximum upward position.

Integrally molded to the hood are bosses 43 to which is screwed a strap 44 that carries a lamp socket 47 into which may be inserted a bulb 50 of the usual bayonet type. The socket and strap may be welded together or secured in any suitable fashion.

The strap, being of metal, can serve as a grounding connection to the lamp socket and a lead 53 is attached to the holding screw as shown in FIGURE 3. A lead 55 connects conventionally to the center terminal of the socket. Any suitable opening may be provided for bringing the leads out for connection to the automobile light switch so that when the lights are turned on the lamp 50 will be lit. Thus, a bore 56 as shown in FIGURE 2 may be provided for that purpose or the hood sides may be designed with sufficient clearance with respect to the rotary bowl 17 so that the lead wires can be brought out of the hood between the lower edge of one side of the hood and the bowl.

The hood is shaped to conform to the general bowl shape, having an arcuate top and arcuately shaped edges at the sides, for that purpose, the arcuateness of the top and the side edges being generally parallel.

In order to fasten the hood to the steering column, the rear of the hood has thickened abutments or side formations 60 which may be tapped or may have metallic nut tap inserts such as 63 as indicated in FIGURE 2. A molded plastic yoke 66, preferably of the same material as the hood, is internally semi-circular at 68, which yoke, in conjunction with the semicircular opening 70 at the rear of the hood forms a complete circle for gripping the steering column 10. Yoke 66 is provided with through-bores 72 through which screws 74 can pass to be threaded into the tapped insert 63. Thus the hood is firmly gripped on the steering column, and locked in place against rotation by entry of the upper edge of transparent plate 23 into groove 40, fitting closely over bowl 17 with some slight clearance 76 along the arcuate side edges so as not to bind the bowl against rotation.

The invention is very effective in providing full illumination for the indicator scale so that a driver is apprised of the needle position. If desired, a frosted bulb may be used to cut down glare or a suitable translucent filter cap may be placed over the bulb in a well known manner.

Having thus described the invention, I am aware that many changes may be made without departing from the spirit thereof and accordingly I do not seek to be limited to the precise illustration herein given except as set forth in the appended claims.

I claim:

1. An illuminating device for gear shift indicators, comprising a hood of opaque material having a top and sides and an arcuately shaped open front to be disposed contiguous with a transparent scale plate of an indicator device and having a rear portion with an opening to encompass a portion of a steering column, and a lamp socket secured within said hood for holding a lamp bulb, and securing means for securing said hood to a steering column, at said rear portion.

2. The combination of an automobile steering column, rotary transmission shift bowl thereon, an indicator scale fixed relative to said column, and an indicator needle having rotary motion with said bowl, and an illuminating device wherein said device comprises a hood having a top and depending sides, and means connected to said hood for mounting said hood on said column so as to be disposed over said rotary bowl with said sides extending downwardly adjacent corresponding sides of said rotary bowl, said hood having a forward portion adjacent said indicator scale and substantially encompassing the sides and top of said scale, and lamp means within said hood, the top and sides of said hood being shaped to substantially enclose said lamp means between said hood, said indicator scale and said rotary bowl to minimize stray light and to effect light emergence primarily through said indicator scale.

3. An illuminating device for a gear shift indicator scale, comprising a hood having a top wall and depending side walls with edges disposed to substantially meet the corresponding surfaces of a rotary transmission shift bowl when said hood is mounted thereover, said hood having a forward wall portion with an opening to accommodate an indicator scale, said hood having a rearward portion with an opening for encompassing a portion of a steering column carrying said bowl means for carrying a lamp within said hood, and means coacting with said rearward portion of said hood to secure said hood to said steering column in position over said bowl.

4. An illuminating device as set forth in claim 3, including, in combination therewith, a shift indicator scale.

5. A device as set forth in claim 3, said latter means comprising a yoke and fastener means for fastening said yoke to said rearward portion of said hood for securing said hood on said steering column.

References Cited by the Examiner
UNITED STATES PATENTS

| | | | |
|---|---|---|---|
| 2,231,143 | 2/1941 | Tinkham | 240—8.6 |
| 2,638,297 | 5/1953 | Weinberger | 240—52.5 |
| 2,762,906 | 9/1956 | Wirges | 240—7.1 |
| 2,869,506 | 1/1959 | Grady | 116—124 |
| 2,925,061 | 2/1960 | Thornburgh et al. | 116—124 |
| 3,050,028 | 8/1962 | Griffen et al. | 116—124 |

LOUIS J. CAPOZI, *Primary Examiner.*